United States Patent [19]

Youval et al.

[11] 4,182,582

[45] Jan. 8, 1980

[54] POROUS TUBES AND HOLLOW PROFILE STRUCTURES AND METHOD OF MAKING SAME

[75] Inventors: Anat Youval, Herzlia-on-Sea; Moshe A. Frommer, Rehovot; Shmuel Movshovich, Holon; Adriana Cojocaro, Herzlia, all of Israel

[73] Assignee: A. T. Ramot Plastics Ltd., Tel Aviv, Israel

[21] Appl. No.: 759,751

[22] Filed: Jan. 17, 1977

[30] Foreign Application Priority Data

Jan. 27, 1976 [IL] Israel .................................. 48917
Feb. 13, 1976 [IL] Israel .................................. 49033

[51] Int. Cl.$^2$ ..................... B29D 27/00; A01G 25/06
[52] U.S. Cl. ..................................... 405/45; 264/45.3; 264/45.9; 264/49; 264/117; 264/173; 405/43
[58] Field of Search ................. 264/45.9, 46.1, 171, 264/173, 117, 53, 54, 49, 45.3; 61/11, 12, 13; 405/43, 45

[56] References Cited

U.S. PATENT DOCUMENTS

| | | | |
|---|---|---|---|
| 271,089 | 1/1883 | Lynch | 61/13 X |
| 640,077 | 12/1899 | Bagby | 61/13 |
| 901,582 | 10/1908 | Austin | 61/13 |
| 968,226 | 8/1910 | Ziller | 61/11 X |
| 1,952,469 | 3/1934 | Snyder et al. | 264/171 |
| 1,952,470 | 3/1934 | Stephens | 264/173 X |
| 2,096,362 | 10/1937 | Lehman | 264/171 |
| 2,291,238 | 7/1942 | Kimmick | 264/173 X |
| 2,536,196 | 1/1951 | MacLeod | 61/13 |
| 2,771,320 | 11/1956 | Korwin | 61/12 X |
| 2,782,829 | 2/1957 | Peterson et al. | 264/173 X |
| 2,798,768 | 7/1957 | Babin | 61/13 X |
| 2,807,505 | 9/1957 | Weitzel | 264/45.9 X |
| 2,999,293 | 9/1961 | Taff et al. | 264/117 X |
| 3,054,705 | 9/1962 | Mitchell et al. | 264/117 X |
| 3,080,124 | 3/1963 | Rathmann | 61/13 X |
| 3,103,789 | 9/1963 | McDuff et al. | 61/11 |
| 3,223,761 | 12/1965 | Raley | 264/171 X |
| 3,302,408 | 2/1967 | Schmid | 61/13 |
| 3,331,900 | 7/1967 | Thomas | 264/46.1 |
| 3,342,911 | 9/1967 | Funahashi | 264/49 X |
| 3,351,495 | 11/1967 | Larsen et al. | 264/49 X |
| 3,401,526 | 9/1968 | Rodgers | 61/11 X |
| 3,406,426 | 10/1968 | Pobst et al. | 264/117 X |
| 3,476,844 | 11/1969 | Villain | 264/49 |
| 3,513,060 | 5/1970 | Krystof | 264/171 X |
| 3,528,251 | 9/1970 | Falk | 61/13 |
| 3,536,796 | 10/1970 | Rock | 264/49 |
| 3,551,538 | 12/1970 | Yamamoto et al. | 264/49 |
| 3,552,654 | 1/1971 | Thomas | 264/46.1 X |
| 3,557,265 | 1/1971 | Chisholm et al. | 264/171 X |
| 3,558,753 | 1/1971 | Edlin | 264/54 |
| 3,566,607 | 3/1971 | Sixt | 61/11 |
| 3,699,684 | 10/1972 | Sixt | 61/11 |
| 3,715,420 | 2/1973 | Kiyono et al. | 264/171 |
| 3,716,612 | 2/1973 | Schrenk et al. | 264/173 X |
| 3,830,067 | 8/1974 | Osborn et al. | 61/12 |
| 3,833,704 | 9/1974 | Nissel | 264/171 |
| 3,855,376 | 12/1974 | Ono et al. | 264/46.1 |
| 3,903,929 | 9/1975 | Mock | 61/11 X |
| 3,911,072 | 10/1975 | Saito et al. | 264/117 |
| 3,956,438 | 5/1976 | Schippers | 264/53 X |
| 3,992,496 | 11/1976 | Matsunaga et al. | 264/49 |
| 4,061,272 | 12/1977 | Winston | 61/13 X |

FOREIGN PATENT DOCUMENTS

| | | | |
|---|---|---|---|
| 623471 | 7/1961 | Canada | 61/13 |
| 946173 | 4/1974 | Canada | 61/12 |
| 1484387 | 1/1969 | Fed. Rep. of Germany | 61/12 |
| 1200303 | 12/1959 | France | 61/13 |
| 1405962 | 6/1964 | France | 264/41 |
| 539173 | 2/1956 | Italy | 61/13 |
| 703595 | 2/1954 | United Kingdom | 61/12 |
| 956046 | 4/1964 | United Kingdom | 61/13 |
| 1043762 | 9/1966 | United Kingdom | 264/49 |
| 1290847 | 9/1972 | United Kingdom | 61/13 |

OTHER PUBLICATIONS

*The Condensed Chemical Dictionary*, Eighth Edition, Revised by Gessner G. Hawley, New York, Van Nostrand Reinhold, ©1971, pp. 461, 706, 707, 714.

*Primary Examiner*—Philip Anderson
*Attorney, Agent, or Firm*—Benjamin J. Barish

[57] ABSTRACT

A method of producing porous tubes and hollow profile structures is characterized by coextruding different materials each through a separate section of a tube-forming extrusion die, one material being pore-forming and producing a porous wall section extending lengthwise of the extruded tube for providing a means of dispersing therethrough a fluid flowing internally of the tube, the other material being non-pore-forming or less pore-forming and producing a non-porous or less porous wall section extending lengthwise of the tube for providing mechanical strength to the tube.

Also disclosed are a number of porous tube and hollow profile structures including various arrangements of porous and non-porous wall sections.

11 Claims, 12 Drawing Figures

POROUS TUBES AND HOLLOW PROFILE STRUCTURES AND METHOD OF MAKING SAME

BACKGROUND OF THE INVENTION

The present invention relates to porous tubes and other hollow profile structures, and to methods of making such structures. The invention also relates to a method of making shaped microporous articles particularly useful in making the above structures.

Porous, particularly micro-porous, tubes are increasingly being used in many diverse applications. One broad application is gas disperser systems, such as fish pond aeration, waste-water treatment, and the like; other applications include liquid distribution systems, such as drip irrigation or chemical processing systems. Many techniques are known for producing the porous tubes, e.g., by including a leachable additive or a blowing agent within a plastics matrix. However, the porous tubes are quite expensive to produce according to the conventional techniques, and moreover they have low mechanical strength. These drawbacks limit their potential applications.

Among the objects of the present invention are to provide a new method of making porous tubes and hollow profile structures, and to provide new porous tube structures, which method and structures have advantages in the above respects.

Further, a known method of producing shaped microporous articles involves a leaching process in which the two main components are a thermoplastic material and a leachable polymer material. These materials are basically incompatible with each other, and are usually available in different physical forms, the thermoplastic matrix material being granular, and the leachable polymeric material being powdered. In the known process, these two materials are intimately mixed under heat and pressure, such as by kneading or milling, until a uniform blend is obtained. The blend is cooled, shaped by a thermoplastic (heating) process, such as extrusion, calandering or moulding; and then the leachable polymeric material is removed, thereby resulting in the shaped microporous article.

The above known technique has several drawbacks: Thus, the mixer must compound both of the polymeric components during the step in which they are mixed under heat and pressure, this being done in special kneading or milling machines which are very expensive. In addition, because the mixer must accommodate both components, the apparatus required must be relatively large. Further, in the conventional technique the thermoplastic matrix material is subjected to two heating operations, one during the above mixing step and the other during the thermoplastic shaping step, which two heating steps tend to produce more heat degradation of the matrix material.

Another object of the present invention, therefore, is to provide a method of producing shaped microporous articles having advantages in the above respects.

SUMMARY OF THE INVENTION

According to one aspect of the present invention, there is provided a porous thermoplastic tube constituted of a plurality of wall sections in the form of longitudinally-extending strips of thermoplastic material each of partially-circular cross-section to define together a composite tube of circular cross-section. At least one of the wall-section strips is of a porous thermoplastic material which is continuously porous from its inner face to its outer face, to provide means for dispersing therethrough a fluid flowing internally of the tube; and at least an other of the wall-section strips is of a non-porous thermoplastic material which is completely non-porous from its inner face to its outer face to provide mechanical strength to the tube.

According to another aspect of the invention, there is provided a method of producing the above porous tube structure, comprising the steps of co-extruding two thermoplastic materials through an extrusion die to form a tubular wall having a first wall-section strip constituted of one material, and a second wall-section strip constituted of the other material. The one material includes a leachable additive, and the other material is devoid of the leachable additive. The tube, after extrusion, is subjected to a liquid which leaches out the leachable additive. Thus, the first wall-section strip in the resulting tube is made porous continuously from its inner face to its outer face for providing the means for dispersing a fluid flowing internally of the tube, whereas the second wall-section strip is non-porous for providing the mechanical strength to the tube.

The method may be efficiently and inexpensively performed by known extruders presently used for co-extruding different colored materials to produce color-striped tubes (as will be more particularly noted below), but in the case of the present invention, a pore-forming material and a non-pore-forming material would be co-extruded.

According to another aspect, the invention provides a number of novel porous tube structures which can be efficiently and inexpensively made in accordance with the above method.

According to a further aspect of the present invention, there is provided a method of producing shaped microporous articles, particularly porous tubes as described above, wherein at least a portion of the tube wall is made from a thermoplastic matrix material and a leachable polymeric material, comprising: introducing the leachable polymeric material in the form of a powder into a mixer and mixing same at a temperature approaching the melting point of the powder to promote the adhesion of the powder particles to form sintered irregular crumbs; cooling the sintered irregular crumbs of the leachable polymeric material; grinding the sintered irregular crumbs of the leachable polymeric material together with granules of the thermoplastic matrix material until a uniform blend is obtained; extruding or otherwise thermoplastically shaping the so-produced blend; and leaching out the leachable polymeric material.

It will thus be seen that in the above method, the mixer need only accommodate the leachable polymeric material, and therefore can be of substantially smaller size. Also, a less-expensive high-speed mixer may be used instead of the more expensive kneading or milling machine heretofore used. Thus, the required blend homogeneity of the two materials is attainable with less expensive equipment. Further, since the thermoplastic matrix material is subjected only to one heating step, namely the extrusion (or other thermoplastic shaping) of the blend, there is less chance for heat degradation of that material.

In the preferred embodiments of the invention described below, the sintered irregular crumbs of the leachable polymeric material are ground together with granules of the thermoplastic matrix material in proportions, by weight, of about 0.3–5 parts leachable polymeric material per part thermoplastic matrix material. Also, the leachable polymeric material is a water-soluble polymer, the leaching step being performed by washing out the leachable polymeric material with water.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
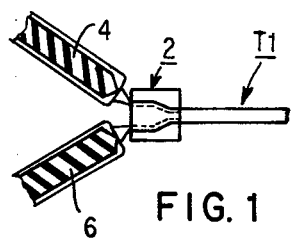
FIG. 1 digrammatically illustrates extrusion apparatus that may be used for producing the porous tubes in accordance with the present invention.

With reference first to FIG. 1, there is illustrated an extrusion head or die generally designated 2, having two screw feeders 4 and 6 receiving the thermoplastic material to be extruded by head 2 to form a tube T1. As indicated above, such extruders are known and are used, for example, for producing color-striped tubes, in which case the two materials fed by screws 4 and 6 would be of different colors. Such equipment is well known and is described in the literature, for example in the book "Plastic Extrusion Technology and Theory", by Dr. Ing. Gerhard Schenkel (Iliffe Books Ltd., London, 1966), particularly on pages 394–396. In the present case, however, one material introduced into screw feeder 4 would be a pore-forming compound, and the other material introduced into screw-feeder 6 would be a non-pore-forming compound. For example, the pore-forming compound could be a thermoplastic material having a leachable additive therein, or having a blowing agent therein; and the non-pore-forming-compound could be of the same thermoplastic but without the leachable additive or blowing agent. Such materials are known for producing porous, or microporous, articles, and examples of each are set forth below.

Figure 2A:
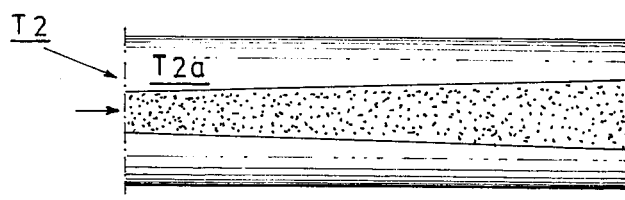
FIGS. 2 and 2a are transverse sectional and side elevational views, respectively, illustrating one form of porous tube structure that may be produced in accordance with the invention.
Figure 2:
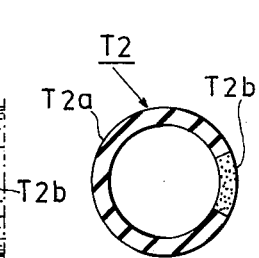

FIG. 2 illustrates a porous tube generally designated T2, in which its external wall is constituted of a plurality of wall-sections in the form of longitudinally-extending strips of thermoplastic material each of a partially-circular cross-section to define together a composite tube of circular cross-section. FIG. 2 includes a single non-porous wall-section strip T2a extending lengthwise of the tube, and a single porous wall-section strip T2b extending lengthwise of the tube. The non-porous wall-section strip T2a provides mechanical strength to the tube, and the porous wall-section strip T2b, provides a means of externally dispersing a fluid flowing to its internal passage P2.

It will be appreciated that by the appropriate selection of the extrusion die 2 and by the appropriate control of the screw feeders 4 and 6 for extruding the two different materials, there can be provided many different porous tube structures and porosities.

FIG. 2a, which is a side elevational view of the tube T2 of FIG. 2, shows another advantage in the present invention, in that it enables tubes to be produced wherein the porous wall-section strip T2b is of increasing width lengthwise of the tube so as to provide a substantially constant dispersion of the fluid along the tube length notwithstanding variations in pressure drop from the upstream end of the tube to the downstream end. Such a construction is particularly advantageous, for example, in gas dispersion systems wherein the increasing width of the porous wall-section strip T2b compensates for the inherent pressure drop of the gas as it flows through the tube, thereby providing a substantially uniform distribution of the gas along the tube length, thereby diminishing the coalescence of gas bubbles in a liquid and increasing the gas transfer efficiency.

Figure 3:
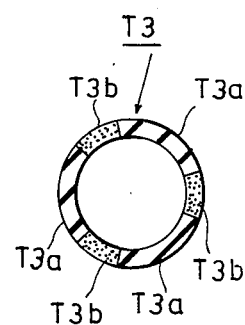
FIG. 3 is a transverse sectional view illustrating another porous tube structure that may be produced in accordance with the invention.

FIG. 3 illustrates another tube structure, generally designated T3, that may be conveniently produced by the present invention. In this case, the external wall of the tube includes a plurality of non-porous-sections or strips T3a extending along the length of the tube and alternating circumferentially with a like plurality of porous sections or strips T3b also extending along the length of the tube. The use of a plurality of the non-porous wall-section strips alternating with the porous wall-section strips enhances the overall mechanical strength of the tube and also increases the uniformity of distribution of the fluid around the circumference of the tube. Such a construction is particularly useful, for example, in root-irrigation systems to diminish water losses by infiltration in the ground; and in fish pond aeration systems, and waste-water treatment systems wherein it is desirable to effect a substantially uniform dispersion of air or another gas around the circumference of the porous tubes.

Figure 4:
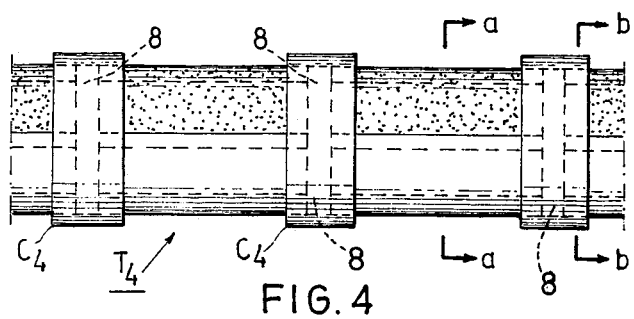
FIGS. 4, 4a, 4b illustrate another porous tube structure that may be produced in accordance with the invention, FIG. 4 being a side elevational view of the structure, and FIGS. 4a, 4b being transverse sectional views along lines a—a and b—b of FIG. 4.
Figure 4A:
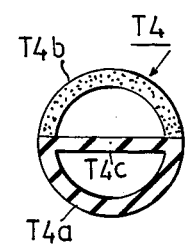
Figure 4B:
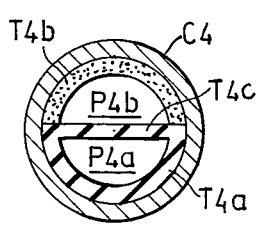

FIGS. 4, 4a and 4b illustrate a further porous tube structure, generally designated T4, that may be produced in accordance with the invention. As shown particularly in FIG. 4a, the tube wall includes a substantially semi-circular non-porous wall-section strip T4a, a substantially semi-circular porous wall-section strip T4b, and a non-porous internal partition T4c extending along the length of the tube at the junctures of the two sections and dividing the tube interior into two passageways T4a and T4b. Passageway T4a is bounded on all its sides by the non-porous wall-section strip T4b and therefore it is impervious to a fluid flowing therethrough. Passageway T4b is partially bounded by the porous wall-section strip T4b and is therefore pervious to a fluid flowing therethrough.

As illustrated in FIGS. 4 and 4b, the tube structure T4 is particularly useful in an assembly wherein a plurality of the tubes are connected at their ends by sleeve couplings C4 which provide communication between the two passageways P4a and P4b in each tube. Each pair of tubes T4 coupled at their ends by a coupling sleeve C4 do not abut each other, and thereby provide a space 8 (FIG. 4) between the two ends. this space between the tube ends defines a chamber bounded by the internal surface of coupling sleeve C3 and communicating with the ends of the two passageways P4a and P4b of each of the two tubes being coupled. Such an arrangement is particularly useful for uniformly distributing the fluid, such as liquid, by passing the liquid to be distributed through both passageways P4a and P4b at the same pressure, the spaces 8 providing common chambers at periodic intervals equalizing the pressure in the two passageways and thereby tending to provide more uniform fluid dispersion along the length of the tube assembly.

Figure 5:
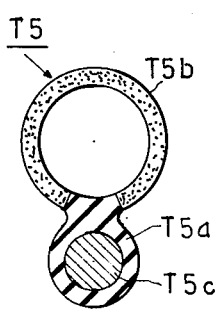
FIGS. 5–8 are transverse sectional views illustrating further forms of porous tube structures that may be produced in accordance with the invention.

FIG. 5 illustrates a still further porous tube structure, generally designated T5, that may be constructed in accordance with the invention. In this case, the external wall of the tube includes a non-porous wall-section strip T5a which is substantially tubular, and a porous wall-section strip T5b which is also substantially tubular and joined to tubular section T5a along one edge of each. Passageway P5 of the porous tubular section T5b is used for conducting the fluid which is to be dispersed through its porous wall, and the non-porous tubular section T5b receives a strengthening element, such as a cord, rod or wire T5c, for strengthening or supporting the former section. Thus, the mechanical strength of the porous tube is enhanced not only by the provision of the non-porous wall section T5a, but also by the cord, rod, or wire received within the latter section.

The cord, rod, or wire T5c may be selected not only for contributing strength to the porous tube, but also for controlling the buoyancy of the tube, for example to assure it will remain immersed in the medium to be aerated or treated. It may also serve as a means for enabling the securing, tensioning or suspending of the porous tube.

Figure 6:
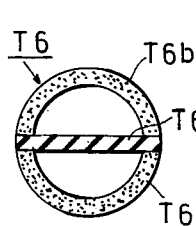
Figure 7:
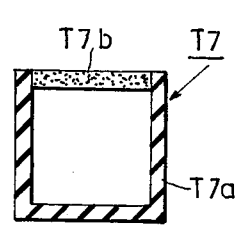
Figure 8:
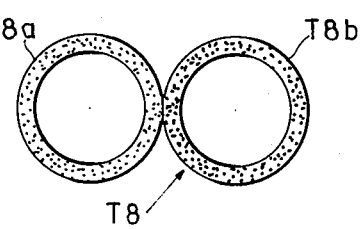

FIGS. 6-8 illustrate still further variations. In FIG. 6, the tube T6 is of similar structure as tube T4 in FIG. 4, except that one of the semi-circular wall-section strips T6a, instead of being non-porous as wall-section strip T4a in FIG. 4, is also porous. The internal partition wall T6c is non-porous, as in FIG. 4. Such a structure is particularly useful for diffusing two different gases from different sides of the tube.

FIG. 7 illustrates a variation wherein the tube structure is not of circular section, but is rather of rectangular section. In this case, the illustrated tube T7 is of square section, including three walls T7a of non-porous plastic material, and one wall T7b of porous plastic material.

FIG. 8 illustrates a variation similar to FIG. 5 except that the tube T8 is made of two porous circular sections T8a and T8b, section T8a being less porous than section T8b. Such a structure is particularly useful for diffusing two different gases at different rates.

As indicated above, many pore-forming and non-pore-forming plastic materials are known and can be used. The non-pore-forming compound may be low-density polyethylene commonly used for extrusion. The pore-forming compound may be the same low-density polyethylene but including a blowing agent, such as aryl-bis-sulfohydrazide or azodicarbonamide, or a leachable additive, such as a water-soluble polyethylene oxide resin or a water-soluble starch. Preferred examples of leachable-additive types of pore-forming materials are described below with respect to the flow diagram of FIG. 9 illustrating a procedure for preparing the blend for the pore-forming material, which procedure has been found highly advantageous in the respects discussed above in the introductory portion of the specification.

Figure 9:
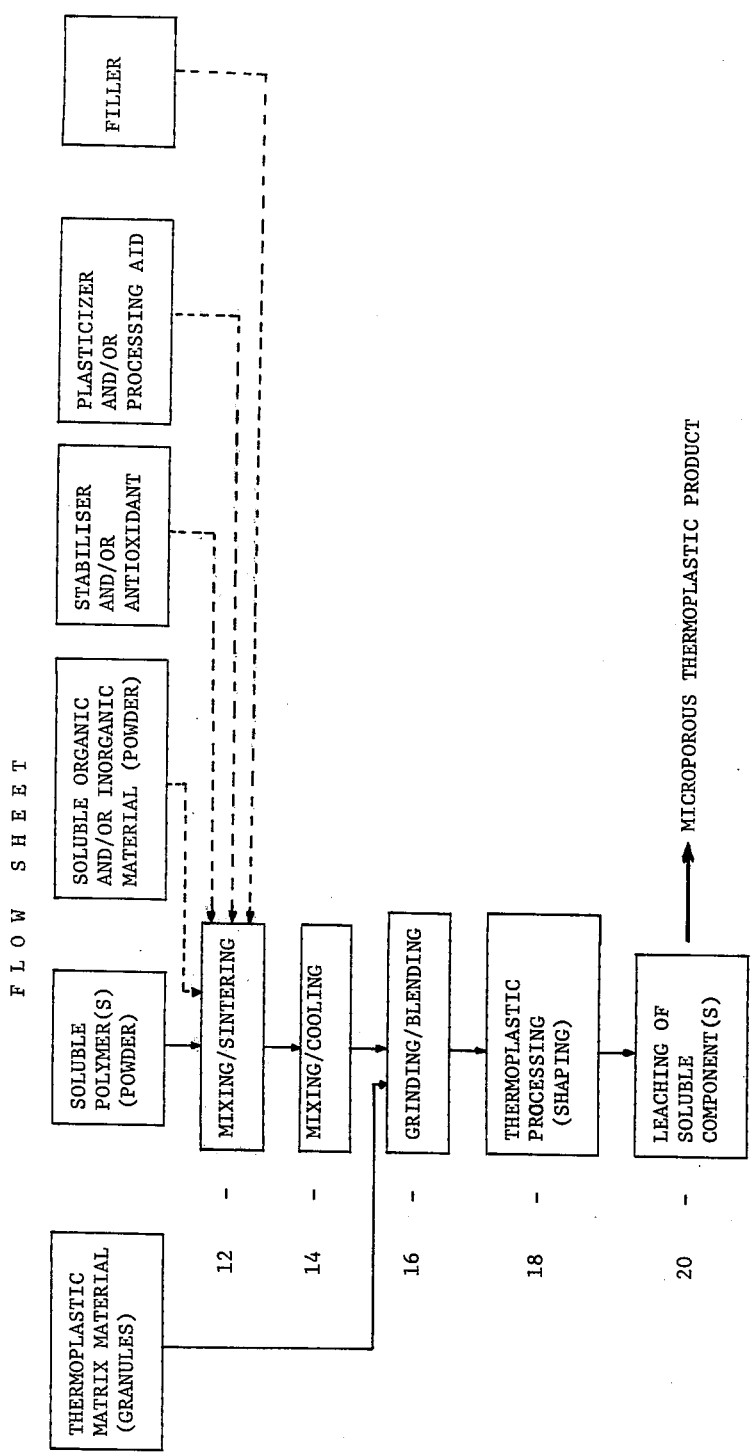
FIG. 9 is a flow diagram illustrating a preferred procedure that may be used in making the porous portions of the structures of FIGS. 2–8.

The flow diagram of FIG. 9 illustrates a preferred procedure that may be used with respect to the production of the porous portion of the article.

As illustrated in FIG. 9, a soluble polymeric material in powdered form, which constitute the leachable component, is introduced into a mixer 12. This mixer is a high-speed mixer and is operable at carefully controlled temperatures, in this case at a temperature approaching the melting point of the leachable polymer to promote the adhesion of the power particles and to form sintered irregular crumbs. As shown by the broken lines also inputted into mixer 12, the mixer may also receive soluble organic and/or inorganic materials in powder form, a stabilizer and/or antioxidant, a plasticizer, or other processing aids, and/or a filler, all of which are mixed with the soluble polymeric material and form therewith the sintered irregular crumbs.

The so-formed sintered irregular crumbs of the soluble polymeric material are cooled under mixing conditions, as shown by box 14, and are then ground together with the thermoplastic matrix material granules as shown by box 16, until a uniform blend is obtained. Preferably, the two materials are ground in proportions, by weight, of about 0.3-5 parts of soluble polymeric material per one of thermoplastic matrix material.

The uniform blend so produced is then subjected to conventional thermoplastic processing or shaping. In this case, it is introduced into the pore-forming section occupied by screw-feeder 4 of the extruder illustrated in FIG. 1.

Finally, the soluble polymeric material is removed by washing same with water.

Following are examples of the various materials that could be used.

Preferred leachable components that may be used are water soluble polymers such as modified celluloses, modified starches, polyvinyl alcohol, polyethylene oxides, polyvinyl pyrrolidone.

Preferred thermoplastic matrix materials which may be used include compounds of polyolefines, polyamides, PVC, polyacetale, polystyrene, polycarbonates, polyacrylics, thermoplastic polyesters and polyaryl ethers.

Soluble inorganic or organic materials that may be used include sodium chloride, potassium chloride, sodium bromide, zinc bromide, urea and thiourea. Stablizers and/or antioxidants that could be used include calcium stearate and stearic acid. Plasticiser and/or processing aids that could be used are low molecular weight polyethylenes, polyethylene glycols, paraffin wax and mineral waxes. Fillers that could be used include talc, calcium carbonate, silicates and glass fibres.

Following are several specific examples:

EXAMPLE 1

250 g. hydroxypropyl cellulose and 250 g. polyethylene glycol (m.p. 55° C.) were sintered in a high speed mixer, by mixing at 2000 RPM during 3 minutes. During this time, the temperature inside the mixer reached about 60° C. Further the rotational speed of the impeller was reduced to 550 RPM for 8-10 minutes, during which time the obtained crumbs were cooled to 25°-30° C.

The crumbs together with 500 g. low density polyethylene granules of 3-4 mm. size were ground in a conventional plastic grinder, using a 2 mm. sieve. Subsequently a uniform blend was obtained. This blend was used for extruding the porous section T2b of tube T2 in FIG. 2, the non-porous section T2a of the tube being made of the same low density polyetheylene but without the leachable additive. The extruded tube was of 6 mm. inner diameter and wall thickness of 1 mm. and after extrusion was subjected to intensive washing with tap water for 72 hrs., producing the microporous structure in the tube wall section T2b.

EXAMPLE 2

500 g. polyethylene oxide (m.p. 65° C.) were sintered to crumbs in the mixer at about 58° C., cooled, ground, subsequently blended together with 500 g. high density polyethylene granules, and extruded as a tube of 12 mm. inner diameter and 1.2 mm wall thickness. It was then intensively washed with tap water for 96 hrs., producing a microporous permeable tube.

EXAMPLE 3

250 g. polyvinyl alcohol, 200 g polyethylene glycol, and 100 g. talc were sintered to crumbs in the mixer at about 55° C., cooled, and subsequently blended together with 500 g. polypropylene. This blend was then shaped by heat-pressure molding into a plate of 2 mm thickness and intensively washed with tap water for 72 hrs., producing a microporous, permeable plate.

EXAMPLE 4

500 g. polyethylene oxide and 5 g. talc were sintered to crumbs in the mixer at about 58° C., cooled, ground, subsequently blended together with a plasticised polyamide 11 compound, and extruded as a tube of 3 mm. inner diameter and wall thickness of 0.75 mm. It was then washed for 96 hrs. with tap water, producing a microporous permeable tube.

The above-described method is particularly useful for making the porous sections of the tubes of FIGS. 2-8, but could be used for making other porous articles, as shown by some of the above examples. Also, while the invention has been illustrated mostly with respect to tubes of circular seciton, it will be appreciated it could also be embodied in tubes (which expression is intended to include hollow profiles) of other sections, such as illustrated in FIG. 7 for example.

As mentioned above, mixer 12, into which the leachable soluble organic and inorganic materials are introduced in powder form, is operated at a carefully controlled temperature approaching the melting point of the leachable organic material to promote the adhesion of the powder particles and to form the sintered irregular crumbs. In order for the powders to be sintered together, it is not necessary that all the materials be melted: it is sufficient that one component is softened so as to bind together the other components. Thus, in the above Examples 1 and 3, the mixture is heated to 60° C., and the softened binding element is the polyethylene glycol, which has a melting point of 55° C. and would thereby be melted to bind together the inorganic powders; whereas in Examples 2 and 4, the binding is effected by the polyethylene oxide which, although having a melting point of 65° C., is sufficiently softened at the heating temperature of 58° C. to bind the particles.

What is claimed is:

1. A porous thermoplastic tube constituted of a plurality of wall sections in the form of longitudinally-extending strips of thermoplastic material each of a partially-circular uniform-thickness cross-section to define together a composite tube of circular cross-section and of uniform thickness, at least one of said wall-section strips being of a porous thermoplastic material which is continuously porous from the inner face to the outer face thereof to provide means for dispersing therethrough a fluid flowing internally of the tube; at least an other of said wall-section strips being of a non-porous thermoplastic material which is completely non-porous from the inner face to the outer face thereof to provide mechanical strength to the tube.

2. A tube according to claim 1, wherein the tube includes a plurality of said porous longitudinally-extending wall-section strips alternating circumferentially with a plurality of said non-porous longitudinally-extending wall-section strips.

3. A tube according to claim 1, wherein the tube is constituted of only one of said porous wall-section strips and one of said non-porous wall-section strips and further includes a non-porous internal partition extending longitudinally of the tube and joined thereto at the junctures of said porous and non-porous wall-section strips, said partition dividing the tube interior into a first passageway having the porous wall-section strip for externally dispersing fluid flowing therethrough, and a second passageway having only the non-porous wall-section strip.

4. An assembly including a plurality of said tubes each in accordance with claim 3 joined at their ends by sleeve couplings providing communication between the two passageways at the ends of each pair of tubes where joined together by the couplings.

5. A tube according to claim 3, wherein said second passageway includes a strengthening wire extending continuously the length thereof.

6. A method of producing shaped microporous articles made from a thermoplastic matrix material and a leachable polymeric material, comprising: introducing the leachable polymeric material in the form of a powder into a mixer and mixing same at a temperature approaching the melting point of the powder to promote the adhesion of the powder particles to form sintered irregular crumbs; cooling the sintered irregular crumbs of the leachable polymeric material; grinding the sintered irregular crumbs of the leachable polymeric material together with granules of the thermoplastic matrix material until a uniform blend is obtained; thermoplastically shaping the so-produced blend; and leaching out the leachable polymeric material.

7. The method according to claim 6, wherein the sintered irregular crumbs of the leachable polymeric material are ground together with granules of the thermoplastic matrix material in proportions, by weight, of about 0.3-5 parts leachable polymeric material per part thermoplastic material.

8. The method according to claim 6, wherein the leachable polymeric material is a water-soluble polymer, the leaching step being performed by washing out the leachable polymeric material with water.

9. The method according to claim 6, wherein the leachable polymeric material is mixed in the mixer with a soluble organic powder material, soluble inorganic powder material, stabilizer, antioxidant, plasticizer and filler.

10. A method of producing a porous thermoplastic tube constituted of a plurality of wall sections in the form of longitudinally-extending strips of thermoplastic material each of a partially-circular uniform-thickness cross-section to define together a composite tube of circular cross-section and of uniform thickness, at least one of said wall-section strips being of a porous thermoplastic material which is continuously porous from the inner face to the outer face thereof to provide means for dispersing therethrough a fluid flowing internally of the tube; at least an other of said wall-section strips being of a non-porous thermoplastic material which is completely non-porous from the inner face to the outer face thereof to provide mechanical strength to the tube; said method comprising the steps of coextruding two thermoplastic materials through an extrusion die to form a tubular wall having a first wall-section strip constituted of one of said materials, and a second wall-section strip constituted of the other of said materials; one of said thermoplastic materials including a leachable additive, and the other being devoid of a leachable additive; and subjecting the extruded tube to a liquid which leaches out said leachable additive, whereby in the resulting tube, the first wall-section strip is made porous transversely therethrough from the inner face to the outer face of the tube and constitutes said porous wall-section strip providing a means of dispersing therethrough a fluid flowing internally of the tube, the second wall-section strip being non-porous and constitutes said non-porous wall-section strip providing mechanical strength to the tube.

11. The method according to claim 10, wherein said one thermoplastic material includes a thermoplastic matrix material and a leachable polymeric material and is processed, before the coextrusion step, by: introducing the leachable polymeric material in the form of a powder into a mixer and mixing same at a temperature approaching the melting point of the powder to promote the adhesion of the powder particles and to form sintered irregular crumbs; cooling the sintered irregular crumbs of the leachable polymeric material; and grinding the sintered irregular crumbs of the leachable polymeric material together with granules of the thermoplastic matrix material until a uniform blend is obtained before coextruding same with said other, non-porous thermoplastic material.

* * * * *